United States Patent [19]

Addario

[11] 4,300,188
[45] Nov. 10, 1981

[54] DETACHABLE LAMP ASSEMBLY

[76] Inventor: Aldo Addario, 68 Perry Ave., Shelton, Conn. 06484

[21] Appl. No.: 81,088

[22] Filed: Oct. 1, 1979

[51] Int. Cl.³ .............................................. H01R 33/00
[52] U.S. Cl. ..................................... 362/226; 362/80; 362/370
[58] Field of Search .......................... 362/226, 80, 370

[56] References Cited
U.S. PATENT DOCUMENTS 4,106,081  8/1978  Turturici ............................. 362/226

Primary Examiner—Stephen J. Lechert, Jr.

Attorney, Agent, or Firm—Mattern, Ware, Stoltz & Fressola

[57] ABSTRACT

By providing a lamp assembly and a support assembly with mating, cooperating plug connectors in combination with a quickly engageable and disengageable positive latch member, a detachable lamp assembly is achieved for use on vehicles, such as boat trailers, for rapid detachment and removal of the light assembly prior to exposure to corrosive water. In addition, the support assembly entirely comprises corrosive resistant material in order to assure continuous, trouble-free operation regardless of the number or duration of its exposure to the water.

10 Claims, 11 Drawing Figures

FIG. 1
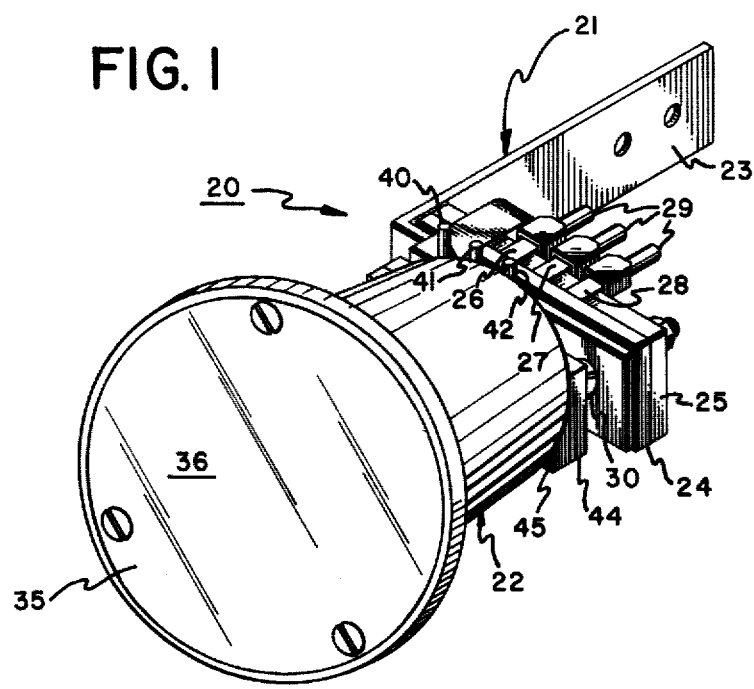
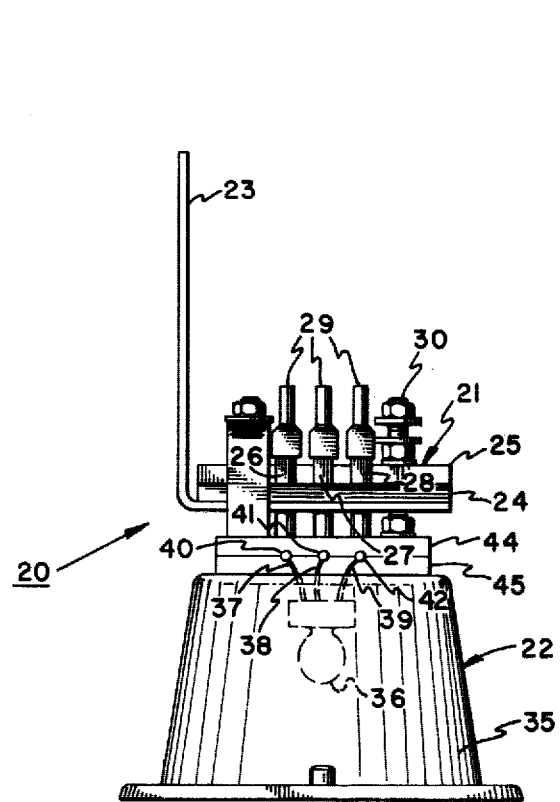
FIG. 2
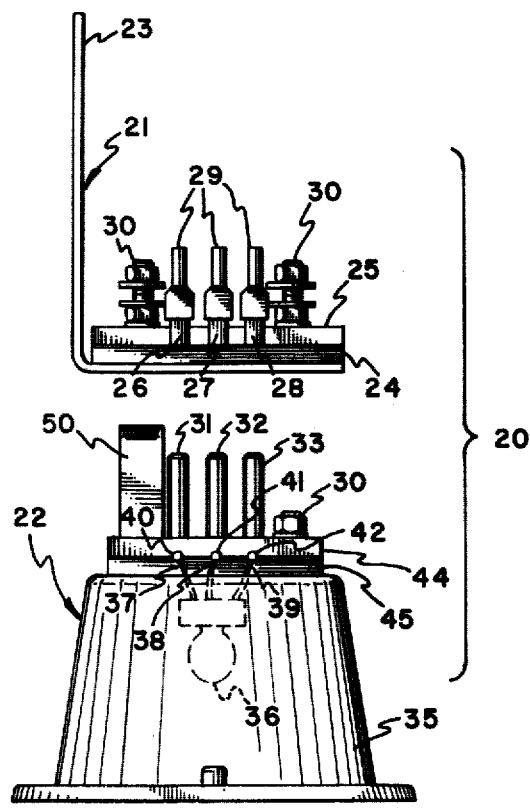
FIG. 3

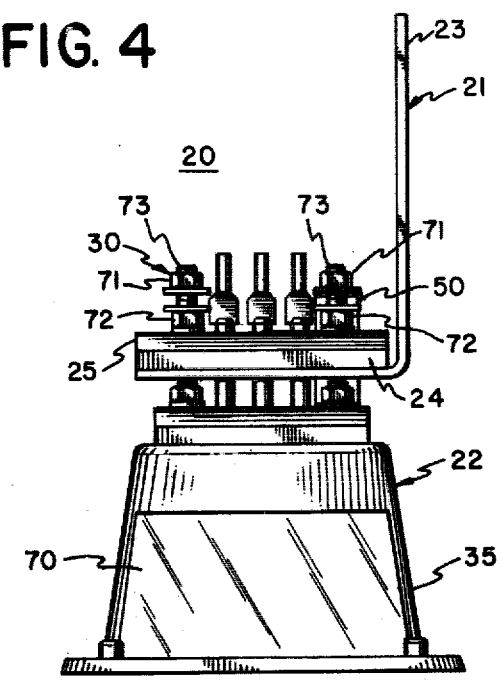
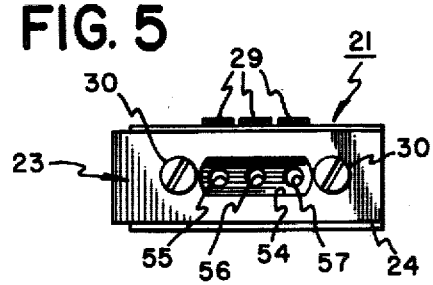
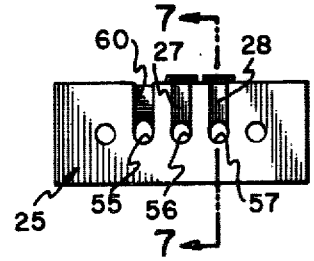
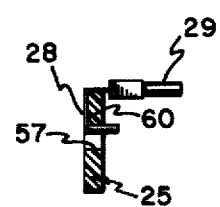
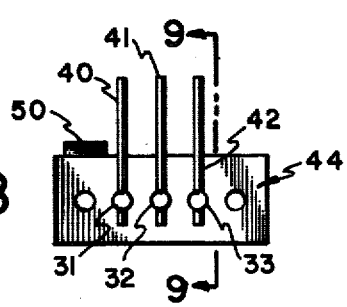
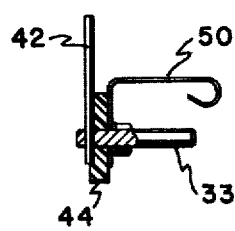
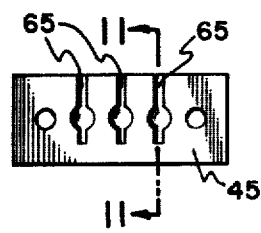
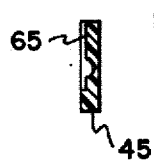

DETACHABLE LAMP ASSEMBLY

TECHNICAL FIELD

This invention relates to detachable light systems and more particularly to quickly removeable light assemblies for use on vehicles, such as boat trailers, in order to prevent exposure of the light assembly to the water.

BACKGROUND ART

It has long been realized that when launching a boat from a boat trailer, the exposure of the light system mounted on the trailer suffers a corrosive attack from the water. After several submersions of the light assembly in the water, the light supporting arms and wire connections become quickly attacked by the water and are rapidly rusted away.

In order to eliminate this problem, prior art light assemblies were constructed for boat trailers wherein the light systems were mounted high above the portion of the trailer which is being submerged. However, these systems proved totally ineffective since their positions were abnormal and did not provide oncoming automobiles with sufficient recognizable illumination. Other systems attempted to mount the entire light assembly to trailer with the light assemblies being removable from the trailer. However, these systems were generally extremely cumbersome and difficult for mounting and removing the light assembly. As a result, the light assemblies were not removed each time the boat trailer was placed in the water, thereby causing these prior art light assemblies to be totally ineffective in preventing corrosion. Such prior art systems are shown in U.S. Pat. Nos. 3,590,236, 3,885,146, and 3,970,837.

U.S. Pat. No. 4,086,479 discloses the only prior art device of which I am aware wherein a lamp assembly is removable from a base affixed to the boat trailer. However, such removable lamp devices as disclosed in this patent have been unable to satisfy the needs of the market to which it is directed. In particular, the lamp assembly is not able to withstand repeated disassemblies and reassemblies by unskilled individuals, without suffering debilitating damage. It has been found that these lamp devices are not securely lockable in engagement with the base and quickly and easily disengaged from the base without imparting damage to the mating contacts, which often results in the contacts failing to mate.

Another problem commonly found with the prior art devices of this nature is the inability of the base, secured to the boat trailer, to withstand the corrosive action of the salt water on which it is repeatedly submerged. As a result, the contacts or electrical connections become rusted out, resulting in a completely unuseable system for its intended purpose.

In addition, the contact construction in the base is easily shorted by water retained in the base, thereby preventing operation of the light system. Also, the removable lamp devices of this type are incapable of locked engagement with the base and are constructed in a manner that allows the lamp device to become jarred loose from the base while the trailer is in motion.

Therefore, it is the principle object of this invention to provide a detachable light system wherein a light assembly is quickly and easily removed from a support assembly by unskilled individuals without necessitating any special handling and without suffering any malfunctioning injury.

Another object of this invention is to provide a detachable light system having the characteristic features defined above while also providing a supporting base rigidly affixed to a trailer which is completely resistant to corrosion from repeated submersions in liquids such as water and salt water.

Another object of this invention is to provide a detachable light system having the characteristic features defined above which is constructed with inherent stability and rigidity to assure continuous, trouble-free operation without fear of unwanted accidental dislodgement, jarring or slippage during its normal use.

A further object of the present invention is to provide a detachable light system having the characteristic features defined above while also providing for a secure readily accessible, easily operated latch mechanism which automatically engages the removable lamp assembly from the support assembly providing a secure, interconnected, unitary operable light system.

Another object of the present invention is to provide a detachable light system having the characteristic features defined above while also incorporating a latch mechanism which is quickly and easily releasable for rapid separation of the lamp assembly from the support assembly.

Another object of the present invention is to provide a detachable light system having the characteristic features defined above which is manufactured using a minimum of parts and is rapidly assemblable into an operable unit without requiring a high degree of technical skills.

A further object of the present invention is to provide a detachable light system having the characteristic features defined above which incorporates a minimum of discrete parts and is capable of distribution as a kit completely assemblable into an operable unit by the consumer.

Another object of the present invention is to provide a detachable light system having the characteristic features defined above wherein the contacts in the supporting base are fully isolated from each other to prevent shorting.

Other and more specific objects will in part be obvious and will in part appear hereinafter.

DISCLOSURE OF THE INVENTION

The present invention obviates the prior art difficulties and drawbacks by providing a detachable light system which incorporates a plug type connection between the removable light assembly and the bracket assembly secured to the trailer. In addition, a latch mechanism is mounted on either the lamp assembly or the support assembly which preferably comprises a flexible leaf-spring arm which securely and automatically interengages the support assembly and the lamp assembly when the plug connections are completed. In addition, disengagement is rapidly achieved by merely moving the latch mechanism out of engagement in order to allow the plug connection to be quickly and easily separated.

In order to provide a detachable light system which will continue to operate in its intended environment without failure and without injurious attack from repeated submersions in the water, the support assembly is constructed from corrosive resistant material which is completely uneffected by the water submersions. In addition, the preferred embodiment of the support assembly incorporates receiving zones for the elongated extending pin connectors of the lamp assembly, with a portion of the receiving zones incorporating contact members to provide the electrical connection with the elongated extending pins of the lamp assembly.

These receiving zones are preferably constructed with a sufficient diameter which assures easy drainage of water, thereby eliminating or keeping retention of the water to a harmless minimum. Also, the contacts are positioned in a portion of the receiving zone away from the area where any water might be retained, in order to eliminate any potential problems.

The detachable light system of the present invention is constructed from a minimum of parts and in a manner which provides for complete disassembly of the entire light system quickly and easily. This assures ease of cleaning and repair. This construction also allows the detachable light system of the present invention to be manufactured and sold as an adapter kit for home assembly onto an existing light housing. In addition, the system of the present invention is capable of complete home maintenance without requiring the purchase of expensive components or a completely new system.

The detachable light system of the present invention preferably incorporates elongated, interconnecting extending plugs for interengagement with the receiving holes. These plugs are formed of solid, rigid, non-deformable material, which assures that any individual, regardless of the individual's proclivity for destruction, will be able to interengage the lamp assembly with the support assembly without deforming or inadvertently bending the contacts into a position which prevents their normal mating connection. Furthermore, the elongated, rigid contact plugs assures complete alignment of the lamp assembly during its interengagement with the support assembly.

The invention accordingly comprises a product possessing the features, properties, and the relation of components which will be exemplified in the products hereinafter described and the scope of the invention will be indicated in the claims.

BRIEF DESCRIPTION OF THE DRAWINGS

FIG. 1 is a perspective view of the detachable light system of the present invention;

FIG. 2 is a top plan view of the detachable light system of the present invention shown in its engaged operative position;

FIG. 3 is a top plan view of the detachable light system of the present invention shown in its disengaged position;

FIG. 4 is a bottom view of the detachable light system of the present invention shown in its engaged, operative position with one embodiment of the light housing depicted therein;

FIG. 5 is a front elevation view of the support assembly of the detachable light system of the present invention;

FIG. 6 is a front elevation view of the support assembly of FIG. 5 depicted partially disassembled;

FIG. 7 is a side elevation view of the disassembled support assembly of FIG. 6;

FIG. 8 is a front elevation view of the rear mounting plate of the lamp assembly showing the pin connection system for carrying current to the lamp means;

FIG. 9 is a side elevation view of the rear mounting plate of FIG. 8 taken along line 9—9 in FIG. 8;

FIG. 10 is a rear elevation view of the contact shielding plate which mates with the plate of FIG. 9; and FIG. 11 is a cross-sectional side elevation view of the plate of FIG. 10 taken along line 11—11 of FIG. 10.

BEST MODE FOR CARRYING OUT THE INVENTION

In FIG. 1, the preferred embodiment of the detachable or separable light system 20 of the present invention is shown. As depicted therein, detachable light system 20 incorporates a support assembly 21 and a lamp assembly 22, which is shown interengaged and conductively connected with support assembly 21.

As also seen in FIGS. 2 and 3, support assembly 21 incorporates a substantially L-shaped bracket 23 and two substantially flat plates 24 and 25 which are mounted to one leg of L-shaped bracket 23. In addition, support assembly 21 also incorporates three contact members 26, 27, and 28 which terminate in shielded protectors 29, which are easily connectable to the electrical system (not shown) of the trailer to which light system 20 of this invention is mounted.

As will be further described and amplified below, contacts 26, 27, and 28 are sandwiched between plates 24 and 25. In this way, each of the contacts 26, 27, and 28 are maintained electrically independent and isolated from each other, thereby eliminating any possible shorting of the contacts due to water submersion or corrosion. As best seen in FIGS. 1 and 3, plates 24 and 25 are maintained in contact with each other and securely attached to one leg of L-shaped bracket 23 by fastening means 30.

As shown in FIGS. 1, 2, and 3, lamp assembly 22 incorporates a lamp housing 35, three elongated plug connectors 31, 32, and 33, and two substantially flat plates 44 and 45. Plates 44 and 45 are mounted to the rear surface of housing 35 and supporting contain plug connectors 31, 32, and 33.

Lamp housing 35 has a construction which is substantially conventional for rear tail lamp assemblies, incorporating a reflector plate 36 and an illuminating member 36 contained within housing 35. As is well known in the prior art, these lamp housings typically incorporate three lead lines connected to the illuminating member in order to provide the capability for directional signaling, continuous on operation, and illumination responsive to brake engagement. In order to provide a system which is compatible with conventional wiring, the three wire standard is employed throughout the present invention and shown throughout the drawings. Of course, variation of the wiring system can be made without departing from the scope of the invention.

The three illumination means control wires 37, 38, and 39 extend from illumination means 36 through housing 35 and are conductively affixed to pin connections 40, 41, and 42. As is more fully detailed below, plug connectors 31, 32, and 33 are integrally connected with contact pins 40, 41, and 42, and are securely mounted to housing 35 by sandwiched interengagement between plates 44 and 45. In addition, plates 44 and 45 with the sandwiched interengagement of pins 40, 41, and 42 provide the requisite electrical isolation of each pin member from the other.

As best seen in FIG. 3, lamp assembly 22, in the preferred embodiment, incorporates leaf-spring locking member 50 which is directly mounted to plate 44. Locking member 50 is constructed to automatically engage support assembly 21 when lamp assembly 22 is slidingly connected therewith. Consequently, a securely locked light system 20 is achieved, which can not accidentally become jarred loose during normal driving conditions.

In addition, the system of the present invention is commercially saleable in kit form as an adapter system. Preferably, this adapter system would incorporate support assembly 21, plug connectors 31, 32, and 33, plates 44 and 45, and pin connectors 40, 41, and 42. Using these components, an existing lamp housing can be quickly and easily converted into the detachable lamp assembly of this invention.

In FIGS. 5, 6, and 7, the preferred construction of support assembly 21 can best be understood. As shown in FIG. 5, bracket 23 of support assembly 21 incorporates an elongated, open receiving zone 54. In addition, plates 24 and 25 each incorporate aligned receiving holes 55, 56, and 57, positioned and constructed for mating interengagement with plug connectors 31, 32, and 33 of lamp assembly 22. Receiving zone 54 of bracket 23 assures that plug connectors 31, 32, and 33 of lamp assembly 22 will be easily securely engaged in the respective receiving holes 55, 56, and 57 without any interference or difficulty.

In order to provide the electrical contact between plug connectors 31, 32, and 33 of lamp assembly 22 with the electronic system of the trailer and ultimately the electronic system of the controlling vehicle, contact members 26, 27, and 28 are sandwiched between plates 24 and 25. In FIG. 6, contact member 26 has been removed in order to show that plate 25 incorporates a recess 60 in which contact 26 is securely positioned and retained. Contacts 27 and 28 are similarly positioned in recesses 60, thereby providing a construction wherein each of the three contact members 26, 27, and 28 are securely mounted and independently isolated from each other, thereby preventing accidental shorting therebetween. As shown in FIG. 7, recess 60 for contact 28 is constructed to provide the positioning of contact 27 within recess 60 so that the outer surface of contact 28 is substantially in the same plane as the surface of plate 25.

In addition, FIG. 7 also clearly depicts the preferred construction for contact 28. As shown therein, contact 28 comprises a substantially C-shaped configuration with the central portion thereof being securely positioned in recess 60. The lower horizontal surface of contact 28 is positioned in receiving hole 57.

In the preferred embodiment, this lower portion of contact 28 extends through the entire receiving hole 57 and a short distance there beyond. In addition, the preferred construction for this lower portion of contact 28 is to form the contact with a curve substantially equivalent to the curve of receiving hole 57. In this way, easy interengagement of plug connector 33 therewith is assured as well as complete electrical connection therebetween.

Contacts 26 and 27 are formed identically to contact 28 and are positioned in their respective retained zones a substantially identical manner as discussed above in reference to contact 28. In this way, contacts 26, 27 and 28 are securely maintained in a specific position, completely electrically isolated from each other, while also being positioned for minimum interaction with the water into which the trailer is submerged. Once substantially flat plate 24 is placed over plate 25, wherein grooves 60 are formed, a major portion of contacts 26, 27 and 28 are shielded and fully protected from coming in contact with the water.

In addition, contacts 26, 27 and 28 are preferably formed from stainless steel in order to prevent any corrosive attack of the contact from the water. Similarly, bracket 23 is formed from stainless steel or any similar material which cannot be corrosively attacked by repeated submersions in the water. As shown in FIG. 7, the lower portion of substantially C-shaped contact 28 is positioned along the top of receiving hole 57, in order to prevent any water retained in recess 57 from remaining in extended residual interaction with contact 28.

In the preferred embodiment, substantially flat plates 24 and 25 are manufactured from material which is completely resistant to any type of corrosive attack from repeated submersions in water. Preferably, substantially flat plates 24 and 25 are constructed from a non-metallic material, such as nylon or Teflon. However, any other type of plastic material having the suitable physical characteristics requisite for continuous trouble-free operation in a water environment could be employed.

By referring to FIGS. 8-11, the construction of the plug connector subassembly mounted to the rear of housing 35 to form light assembly 22 can best be understood. Referring first to FIGS. 8 and 9, plug connectors 31, 32, and 33 are securely mounted in substantially flat plate 44 and extend substantially perpendicularly therefrom. Preferably, the receiving holes through which each of the plug connectors are separately mounted is constructed with a diameter substantially equivalent to the diameter of the plug connector. In this way, a press fit is obtained which assures secure retention of each plug connector in its mounting hole.

In addition, each plug connector is constructed with a contact pin mounted to its proximal end. In the preferred embodiment, as shown in FIG. 9, contact pin 42 is mounted to plug connector 33 by forming a through hole in the proximal end of plug connector 33 and securely mounting contact pin 42 in this hole. Similarly, contact pin 40 is securely mounted to plug connector 31 and contact pin 41 is securely mounted to plug connector 32. In addition, a receiving zone is formed in the surface of plate 44 to securely position and maintain each of the contact pins 40, 41, and 42 fully isolated from each other, thereby preventing any possibility of accidental shorting.

As shown in FIGS. 10 and 11, substantially flat plate 45 incorporates receiving zone 65, which is substantially identical to the receiving zones formed in substantially flat plate 44. These receiving zones are dimensioned and construct to fully surround and securely maintain contact pins 40, 41, and 42 and plug connectors 31, 32, and 33 in secure isolated interengagement fully and completely retained in their desired positions.

In the preferred embodiment, substantially flat plates 44 and 45 are manufactured from non-metallic material, such as nylon or Teflon, in the same manner as flat plates 24 and 25. Of course, as with plates 24 and 25, any other suitable plastic material capable of easy formation and working can be employed.

This plug connector subassembly is completed by mounting locking arm 50 in position for automatic locking interengagement of the light assembly 22 with the support assembly 21. As discussed above, locking arm 50 can be mounted to either light assembly 22 or support assembly 21 without departing from the scope of this invention. As is readily apparent from FIG. 9, the spring locking arm 50 is preferably manufactured from a single, deformation-resistant metallic material with a leading edge having a camming surface 61. With this construction, camming surface 61 causes locking arm 50 to be forced away from its normal position as light assembly 22 advances into interengagement with support assembly 21.

Once light assembly 22 is fully matingly engaged with support assembly 21, the terminating edge of camming surface 61 extends beyond plate 25, causing the locking arm 50 to automatically return to its original position. Once in this position, camming surface 61 extends beyond the rear surface of substantially flat plate 25, establishing locking engagement therewith. This locked arrangement is best seen in FIGS. 1, 2, and 4.

When removal of lamp assembly 22 from support assembly 21 is desired, locking arm 50 is merely lifted a sufficient distance to disengage camming and locking surface 61 from its locking contact with plate 25 of support assembly 21. Then, light assembly 22 is quickly and easily pulled until connectors 31, 32, and 33 have fully and completely disengaged from receiving holes 55, 56, and 57 of support assembly 21.

By referring to FIG. 4, another feature of this present invention can best be understood. As discussed above, support assembly 21 is constructed with substantially flat plates 24 and 25 securely mounted to bracket member 23 by fastening means 30. This secure fastened engagement is achieved by bolt members 73 and nut members 72 in a manner which is common and well known in the art. In addition to this common construction, bolt members 73 extends well beyond nut members 72 and contains second nut members 71 near the terminating ends. The additional nut members 71 on each of the bolt members 73 is employed to securely mount a holding plate to which the boat trailer's license can be securely mounted.

In ths way, support assembly 21 is capable of providing not only a complete and secure light assembly capable of achieving all of the objects set out above, but also provides a support position for securing and maintaining the requisite license plate. In addition, light assembly 22 incorporates a window 70 formed in the lower portion of housing 35 which provides downward illumination so that the license plate can be readily viewable at night.

As is readily apparent to one skilled in this art, two light systems 20 of the present invention must be employed on a conventional trailer in order to provide the necessary rear light for the opposed ends of the trailer. However, the construction shown in FIG. 4 is only employed on one side where the license plate is mounted. On the opposed side, window 70 may be eliminated as well as nuts 71.

It will thus be seen that the objects set forth above, among those made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim is new and desire to secure by Letters Patent is:

1. A detachable light system for mounting to vehicles comprising
   A. a lamp assembly incorporating
      a. a lamp housing,
      b. illuminating means contained within the housing, and
      c. a plug connector subassembly mounted to the housing;
   B. a support assembly incorporating
      a. a bracket adapted for mounting to the vehicle, and
      b. a connector assembly mounted to the bracket and incorporating
         1. corrosion resistant contact means matingly cooperating with the connector of the lamp assembly and adapted for rapid electric engagement and disengagement of the lamp assembly therewith, and
         2. corrosion resistant contact support means; and
   C. latch means
      a. mounted to the light system for cooperative locking interengagement of the lamp assembly and support assembly when the lamp assembly is matingly interconnected with the support assembly, and
      b. easily disengageable from its locked position,
whereby the lamp assembly is capable of quick and easy installation and automatic locking engagement with the support assembly as well as rapidly disengageable therefrom.

2. The detachable light system defined in claim 1, wherein said plug connector subassembly comprises
   1. at least one substantially flat plate, and
   2. a plurality of solid, elongated, rigid plug members, with each of said plug members
      i. mounted at its proximal end to the substantially flat plate and extending substantially perpendicularly therefrom, and
      ii. incorporating a contact pin extending from its proximal end for electrical interconnection with the illumination means of the lamp assembly.

3. The detachable light system defined in claim 2, wherein said plug connector subassembly is further defined as comprising two substantially flat plates positioned in juxtaposed, facing contact with each other, with at least one of said plates incorporating a plurality of separate and distinct holding zones, with each of said zones being dimensioned for the containment of the proximal end of a plug member and the contact pin associated therewith, thereby assuring electrical isolation of each contact pin and plug member.

4. The detachable light system defined in claim 2, wherein said support assembly is further defined as comprising an L-shaped bracket adapted for rapid mounting to a vehicle and the connector subassembly comprises
   3. a substantially flat plate incorporating a plurality of plug member receiving zones positioned for mating engagement of the rigid elongated solid plug members of the lamp assembly therein, and
   4. contact means positioned in each of the receiving zones for mating electrical engagement with the plug connectors inserted therein.

5. The detachable light system defined in claim 4, wherein said support assembly is further defined as comprising two substantially flat plate members positioned in juxtaposed, facing contact with each other, with at least one of said plate members incorporating a plurality of separate and distinct recesses extending from an edge of the plate member to each of the plug receiving zones, for independent, isolated containment of each of the contact means therein.

6. The detachable light system defined in claim 5, wherein each of said contact means are C-shaped and sandwiched between the two plate members, thereby assuring electrical isolation of each contact member from each other as well as isolation from contact with water when the support assembly is submerged.

7. The detachable light system defined in claim 5, wherein said plate member comprises plastic material throughout and said bracket and contacts comprise corrosion resistant material.

8. The detachable light system defined in claim 1, wherein said latch means is mounted to the lamp assembly and comprises a substantially flat elongated spring member incorporating
   c. a camming surface along its leading forward distal end, and
   d. lock means inwardly spaced from said camming surface,
thereby providing automatic locked engagement of the light assembly with the support assembly and easy disengagement.

9. The detachable light system defined in claim 1, wherein the mounting means of the connector subassembly of the support assembly incorporates a holding arm for secure mounting of a registration plate thereto.

10. An adapter assembly for cooperative mounting to a boat trailer lamp housing to form a detachable light system, the adapter assembly comprising
   A. a support assembly incorporating
      a. a bracket adapted for mounting to the vehicle, and
      b. a connector assembly mounted to the bracket and incorporating
         1. corrosion resistant contact means matingly cooperating with the connector of the lamp assembly and adapted for rapid electric engagement and disengagement of the lamp assembly therewith, and
         2. corrosion resistant contact support means;
   B. a plug connector assembly for mounting to the boat trailer lamp housing; and
   C. latch means
      a. mounted to the light system for cooperative locking interengagement of the connector assembly and support assembly when the connector assembly is matingly interconnected with the support assembly, and
      b. easily disengageable from its locked position,
whereby the adapter system is capable of quick and easy installation, providing automatic locking engagement of the lamp housing with the support assembly as well as rapid disengagement therefrom.

* * * * *